US010704636B2

(12) United States Patent
Al-Dahhan (10) Patent No.: US 10,704,636 B2
(45) Date of Patent: Jul. 7, 2020

(54) ELASTOMER SPRING FOR VEHICLE

(71) Applicant: BASF SE, Ludwigshafen am Rhein (DE)

(72) Inventor: Sadiq Al-Dahhan, Dearborn, MI (US)

(73) Assignee: BASF SE, Ludwigshafen am Rhein (DE)

( * ) Notice: Subject to any disclaimer, the term of this patent is extended or adjusted under 35 U.S.C. 154(b) by 81 days.

(21) Appl. No.: 15/754,090

(22) PCT Filed: Aug. 17, 2016

(86) PCT No.: PCT/US2016/047244
§ 371 (c)(1),
(2) Date: Feb. 21, 2018

(87) PCT Pub. No.: WO2017/034866
PCT Pub. Date: Mar. 2, 2017

(65) Prior Publication Data
US 2018/0245652 A1 Aug. 30, 2018

Related U.S. Application Data

(60) Provisional application No. 62/208,302, filed on Aug. 21, 2015.

(51) Int. Cl.
*B60G 11/54* (2006.01)
*F16F 1/377* (2006.01)
*F16F 9/58* (2006.01)

(52) U.S. Cl.
CPC ............ *F16F 1/377* (2013.01); *B60G 11/54* (2013.01); *B60G 2202/143* (2013.01); *B60G 2204/45* (2013.01); *F16F 9/58* (2013.01)

(58) Field of Classification Search
CPC ......... B60G 11/54; B60G 11/52; B60G 11/60; B60G 11/62; B60G 2202/14; B60G 2206/73
See application file for complete search history.

(56) References Cited

U.S. PATENT DOCUMENTS 5,467,970 A * 11/1995 Ratu ................. B60G 7/04
267/152
9,764,612 B2 * 9/2017 Al-Dahhan ............ F16F 1/377
(Continued)

FOREIGN PATENT DOCUMENTS

DE 103 44 102 B3 2/2005
FR 1 229 796 A 9/1960
(Continued)

OTHER PUBLICATIONS

International Preliminary Report on Patentability from corresponding International Application No. PCT/US2016/047244; dated Mar. 8, 2018.
(Continued)

*Primary Examiner* — Faye M Fleming
(74) *Attorney, Agent, or Firm* — DLA Piper LLP (US)

(57) ABSTRACT

An elastomer spring (10) for a vehicle (12) includes a cylindrical body (28) adapted to be disposed within a coil spring (20) of the vehicle (12) and extend axially between a first component (16) and a second component (18) of the vehicle (12), the second component (18) being spaced from and moveable toward the first component (16) along an axis of the coil spring (20). The body (28) has a height greater than a width thereof and a plurality of apertures (38) spaced about the body (28), wherein the apertures (38) are configured to allow the coil spring (20) to compress axially for absorbing energy as one of the first component (16) and the second component (18) move along the axis.

8 Claims, 6 Drawing Sheets

(56) References Cited

U.S. PATENT DOCUMENTS

| | | | |
|---|---|---|---|
| 10,000,102 B2* | 6/2018 | Nolte | B60G 11/54 |
| 2010/0230877 A1* | 9/2010 | Schudt | F16F 1/377 |
| | | | 267/220 |
| 2013/0119593 A1* | 5/2013 | Konno | F16F 1/376 |
| | | | 267/293 |
| 2016/0245362 A1* | 8/2016 | Szostek | F16F 9/585 |
| 2018/0304716 A1* | 10/2018 | Veca | B60G 17/01941 |

FOREIGN PATENT DOCUMENTS

| | | |
|---|---|---|
| FR | 2786838 A1 | 6/2000 |
| GB | 1557747 A | 12/1979 |
| WO | 2014/055599 A1 | 4/2014 |

OTHER PUBLICATIONS

International Search Report and Written Opinion from corresponding International Application No. PCT/US2016/047244; dated Nov. 7, 2016.

Communication pursuant to Article 94(3) EPC from counterpart EP Application No. 16754156.4 dated Jul. 10, 2019.

* cited by examiner

ELASTOMER SPRING FOR VEHICLE

CROSS-REFERENCE TO RELATED APPLICATION(S)

The present application claims priority to and all the benefits of U.S. Provisional Patent Application No. 62/208,302, filed on Aug. 21, 2015, the disclosure of which is hereby expressly incorporated herein by reference in its entirety.

BACKGROUND OF THE INVENTION

1. Field of the Invention

The present invention relates generally to vehicles and, more particularly, to an elastomer spring for a vehicle.

2. Description of the Related Art

Generally, a suspension system of a vehicle limits transmission of an impact force from tires to a frame of the vehicle. For example, when the tires of the vehicle travel over a bump, components of the suspension system jounce or collapse to absorb energy generated by the impact. Such components typically include a damper assembly and a coil spring. However, when the suspension system cannot completely dissipate the energy, the components of the suspension system may impact each other, thereby transmitting forces from the tires to the frame, which is not desirable. Due to constrained packaging space at the wheel, particularly a rear position of the vehicle, an auxiliary spring may be required to help the coil spring manage high loads. Further, due to the constrained packaging space, the suspension system may be damperless and not use a damper assembly.

It is, therefore, desirable to provide an additional spring for a vehicle. It is also desirable to provide an additional spring for a vehicle to prevent components of a suspension system of the vehicle from impacting each other to prevent transmission of a remaining impact force from tires to a frame of the vehicle. It is further desirable to provide an additional spring for the suspension system of the vehicle that compresses axially for absorbing energy. As such, there is a need in the art to provide an elastomer spring for a vehicle that meets at least one of these desires.

SUMMARY OF THE INVENTION

Accordingly, the present invention is an elastomer spring for a vehicle including a cylindrical body adapted to be disposed within a coil spring of the vehicle and extending axially between a first component and a second component of the vehicle. The second component is spaced from and moveable toward the first component along an axis of the coil spring. The body has a height greater than a width thereof and a plurality of apertures spaced about the body. The apertures are configured to allow the spring to compress axially for absorbing energy as one of the first component and the second component move along the axis.

In addition, the present invention is a suspension system for a vehicle including a first component, a second component spaced from and movable toward the first component along a jounce axis, a coil spring disposed between the first component and the second component, and an elastomer spring for absorbing energy between the first component and the second component disposed within the coil spring and extending axially between the first component and the second component. The elastomer spring includes a plurality of apertures. The apertures are configured to allow the elastomer spring to compress axially for absorbing energy as one of the first component and the second component move along the jounce axis.

One advantage of the present invention is that an additional elastomer spring is provided for a vehicle. Another advantage of the present invention is that the elastomer spring compresses axially, absorbing energy and preventing direct impact between a first component and a second component of a suspension system or vehicle, which can damage the components of the vehicle. Yet another advantage of the present invention is that the elastomer spring may be made of a TPU, cast urethane, rubber, or any other elastomer that allows compression. Still another advantage of the present invention is that the elastomer spring is lightweight and durable. A further advantage of the present invention is that the elastomer spring can have a constant or variable rate of compression. Yet a further advantage of the present invention is that the elastomer spring unites the combination of a jounce bumper, spring isolator, and spring. Still a further advantage of the present invention is that the elastomer spring may eliminate the use of a damper assembly for a damperless suspension system of the vehicle. Another advantage of the present invention is that the elastomer spring may be used in environments where humidity is a concern for metal springs.

Other features and advantages of the present invention will be readily appreciated, as the same becomes better understood, after reading the subsequent description taken in conjunction with the accompanying drawings.

DETAILED DESCRIPTION OF THE PREFERRED EMBODIMENT(S)

Figure 1:
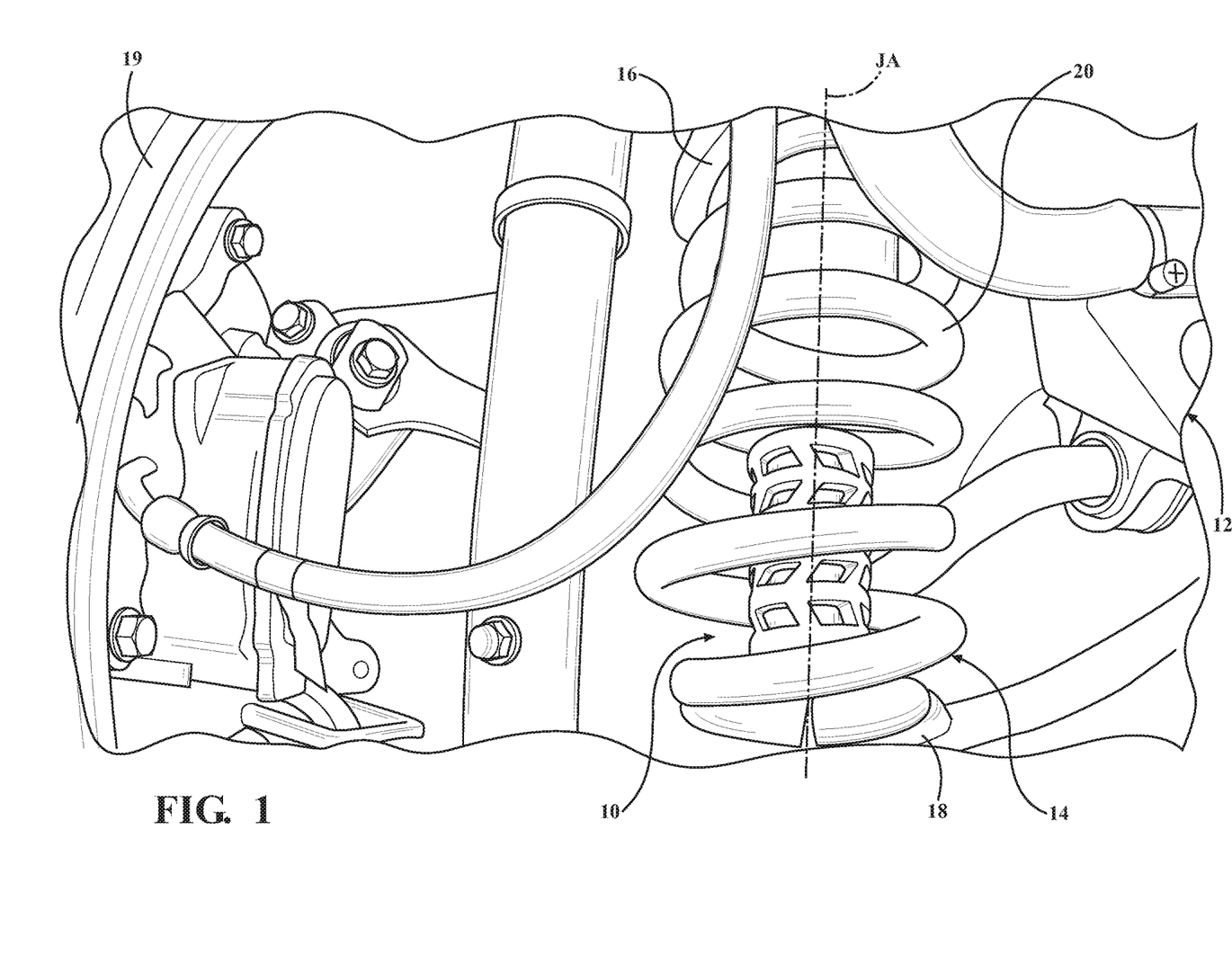
FIG. 1 is a bottom perspective view of one embodiment of an elastomer spring, according to the present invention, illustrated with a portion of a vehicle.

Referring to the figures, wherein like numerals indicate like parts throughout the several views, one embodiment of an elastomer spring, according to the present invention, is shown generally at 10 for a vehicle, generally indicated 12, a portion of which is illustrated in FIG. 1. The vehicle 12 may be an automotive vehicle, a non-automotive vehicle, a bicycle, etc., without departing from the scope of the present invention. In one embodiment, the vehicle 12 may include a suspension system, generally indicated at 14, a portion of which is illustrated in FIG. 1. Typically, either the vehicle 12 and/or suspension system 14 includes a first component 16 and a second component 18. In one embodiment, the first component 16 or the second component 18 is a frame of the vehicle 12. As the vehicle 12 travels over a bump or hits an obstruction, such as a curb, the second component 18 jounces toward the first component 16 as a result of an impact force applied to tires 19 of the vehicle 12. It should be appreciated that, if the impact force is large enough, the second component 18 may contact the first component 16, which can damage either the first component 16 and/or the second component 18, and/or other components of the vehicle 12. It should also be appreciated that the elastomer spring 10 may be used in non-vehicle applications.

In one embodiment, the suspension system 14 is damperless such that it does not include a traditional or conventional damper assembly such as a shock absorber and/or jounce bumper. The vehicle 12 and/or suspension system 14 includes a coil spring 20 disposed between the first component 16 and the second component 18. In one embodiment, the elastomer spring 10 is an additional spring and disposed within the coil spring 20 to prevent direct impact between the first component 16 and the second component 18. The elastomer spring 10 is an intermediate cushion between the first component 16 and the second component 18, which is movable toward the first component 16 along a jounce axis JA of the coil spring 20. It should be appreciated that the elastomer spring 10 is compressed between the first and second components 16, 18 as the first and second components 16, 18 move toward each other.

The elastomer spring 10 is positioned between the first and second components 16, 18 to absorb energy as the first and second components 16, 18 move along a jounce axis JA toward each other to prevent one of the first and second components 16, 18 from directly impacting the other of the first and second components 16, 18. It should be appreciated that absorbing energy as the first and second components 16, 18 move along the jounce axis JA toward each other limits jounce travel and prevents the first and second components 16, 18 from directly impacting each other, which can damage the first and second components 16, 18.

The first component 16 and the second component 18 are spaced from each other. In one embodiment, the coil spring 20 has a first or lower end disposed on the second component 18, which forms a spring seat and a second or upper end disposed on the first component 16, which forms a spring guide. In one embodiment, the elastomer spring 10 is disposed within the coil spring 20 and coupled to the second component 18. It should be appreciated that the elastomer spring 10 may be held in place by the lower end of the coil spring 20 upon the spring seat of the second component 18.

Figures 2, 3:
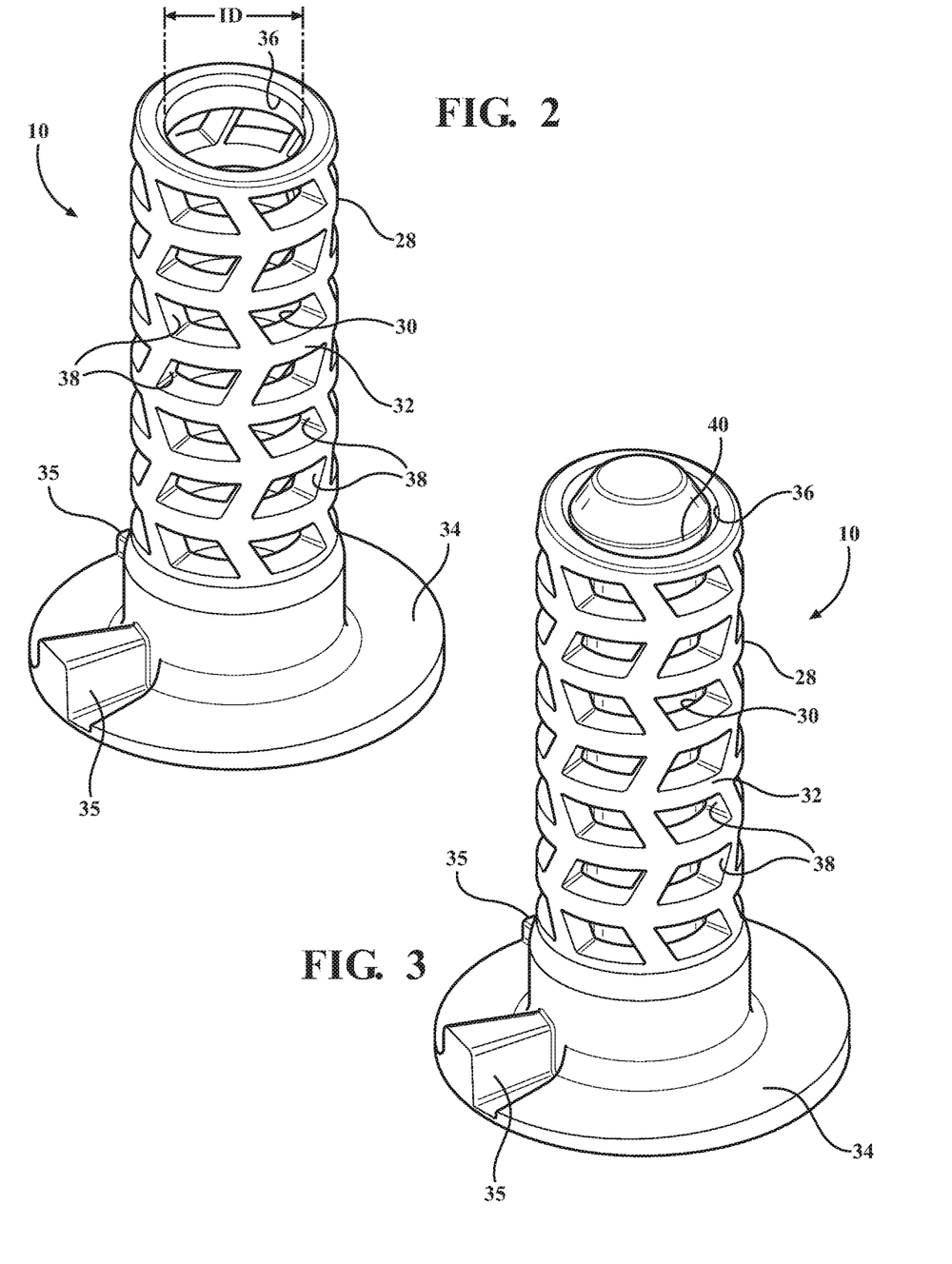
FIG. 2 is a perspective view of the elastomer spring of FIG. 1.
FIG. 3 is a perspective view of another embodiment, according to the present invention, of the elastomer spring of FIG. 1.
Figure 4:
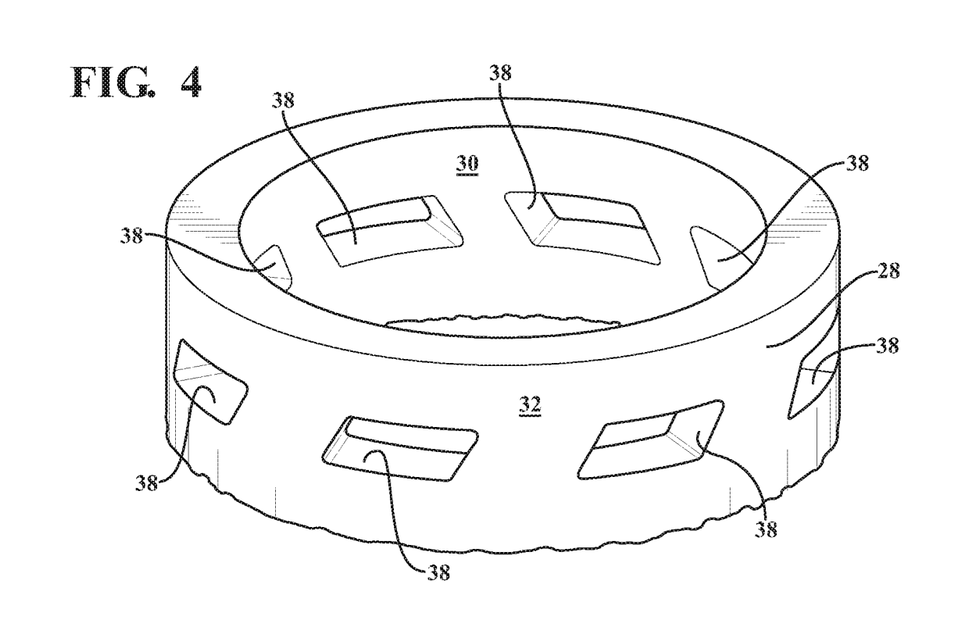
FIG. 4 is a perspective view of a portion of the elastomer spring of FIG. 2 including a plurality of apertures having a parallelogram configuration.

Referring to FIG. 2, the elastomer spring 10 includes a body 28 having a generally cylindrical shaped configuration. The body 28 includes an interior surface 30, which may define a hollow interior to present the body 28 with a ring-shaped cross-sectional configuration. In one embodiment, the body 28 has a generally circular ring-shaped cross-sectional configuration (FIG. 4). The body 28 includes an exterior surface 32 spaced from the interior surface 30. In one embodiment, the body 28 has a thickness of approximately three (3) millimeters to approximately one hundred (100) millimeters between the interior surface 30 and the exterior surface 32. The body 28 has a height greater than a diameter thereof. In one embodiment, the height of the body 28 is at least two times the diameter of the body 28. It should be appreciated that the body 28 may have any suitable thickness and/or height.

The elastomer spring 10 also includes at least one flange 34 extending radially outwardly from the body 28. In one embodiment, the flange 34 is generally circular in shape and extends from a lower end of the body 28. The flange 34 may include one or more locators 35 extending upwardly to allow the flange 34 to be located relative to either one of the coil spring 20 and/or second component 18. In one embodiment, the locator 35 is generally rectangular in shape. In one embodiment, the elastomer spring 10 may include an aperture or opening 36 at an upper end thereof. The elastomer spring 10 is integral, unitary, and formed as a one-piece member. It should be appreciated that the upper end of the body 28 is spaced axially from the flange 34. It should also be appreciated that the opening 36 communicates with an interior of the body 28.

The elastomer spring 10 further includes a plurality of apertures or holes 38 spaced about the body 28 to allow the body 28 to compress axially for absorbing jounce between the first and second components 16, 18. The apertures 38 extend radially through the body 28. When the interior and exterior surfaces 30, 32 are present as described above, the apertures 38 are defined by the interior and exterior surfaces 30, 32. It should be appreciated that the apertures 38 are spaced circumferentially and axially along the body 28 of the elastomer spring 10.

Generally, the apertures 38 influence the compression of the body 28 of the elastomer spring 10. For example, the apertures 38 affect a stiffness of the body 28 of the elastomer spring 10. The stiffness of the body 28 is directly related to an amount of travel the elastomer spring 10 will compress. Said differently, the stiffness of the body 28 affects an amount of the impact force that is dampened by the elastomer spring 10 to prevent the entire impact force from being transferred from the second component 18 to the first component 16. Therefore, increasing the number of apertures 38 and changing a configuration of the apertures 38 directly affects the stiffness of the body 28 of the elastomer spring 10. For example, increasing the number of apertures 38 generally reduces the stiffness of the body 28 of the elastomer spring 10. Additionally, increasing a size of the apertures 38 generally reduces the stiffness of the body 28 of the elastomer spring 10. It should be appreciated that the stiffness of the elastomer spring 10 can be fine tuned by varying the number and size of the apertures 38 in the body 28. It should be appreciated that the stiffness of the elastomer spring 10 can be constant or varied depending on the application in which the elastomer spring 10 is used in.

The body 28 of the elastomer spring 10 has an initial diameter ID. During compression, radial expansion of the body 28 of the elastomer spring 10 is limited because the apertures 38 allow the body 28 to collapse upon itself rather than bulging. Therefore, the elastomer spring 10 can be positioned in tight spaces where radially expansion is not desirable. It should be appreciated that radial expansion of the body 28 of the elastomer spring 10 may be prevented all together such that the elastomer spring 10 does not expand radially when compressed.

Figure 5:
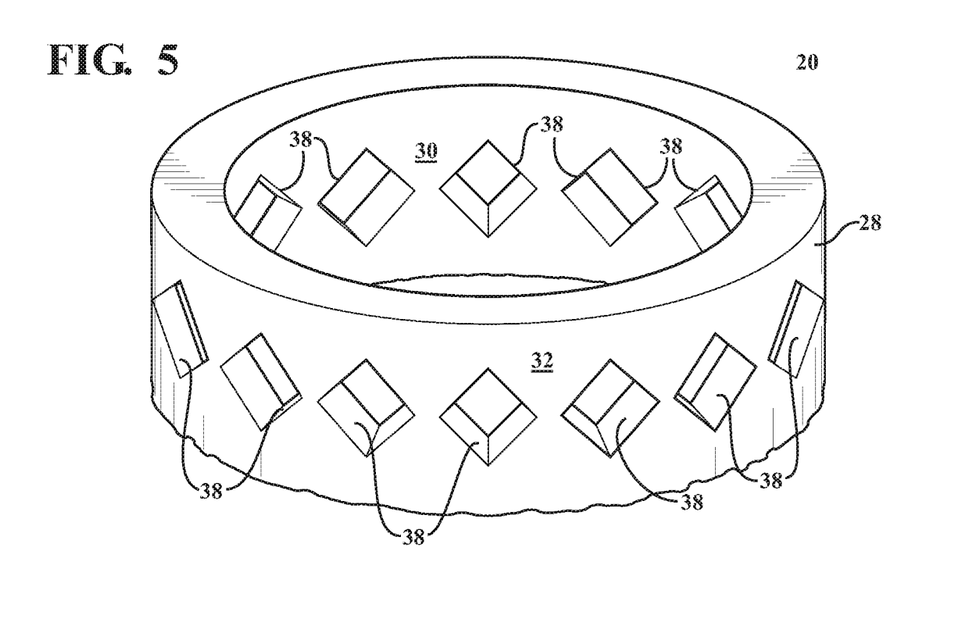
FIG. 5 is a perspective view of a portion of the elastomer spring of FIG. 2 including a plurality of apertures having a rhomboidal configuration.
Figure 6:
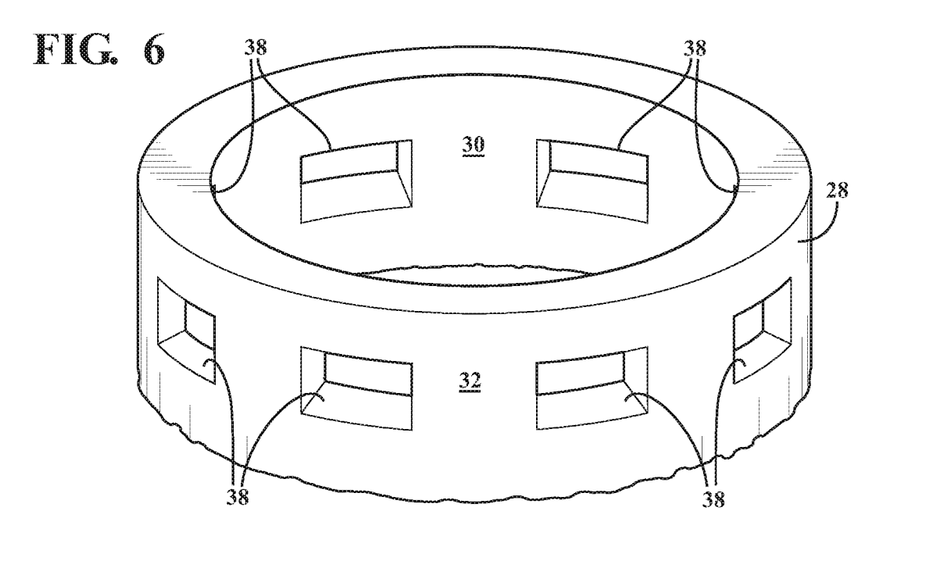
FIG. 6 is a perspective view of a portion of the elastomer spring of FIG. 2 including a plurality of apertures having a rectangular configuration of FIG. 1.
Figure 7:
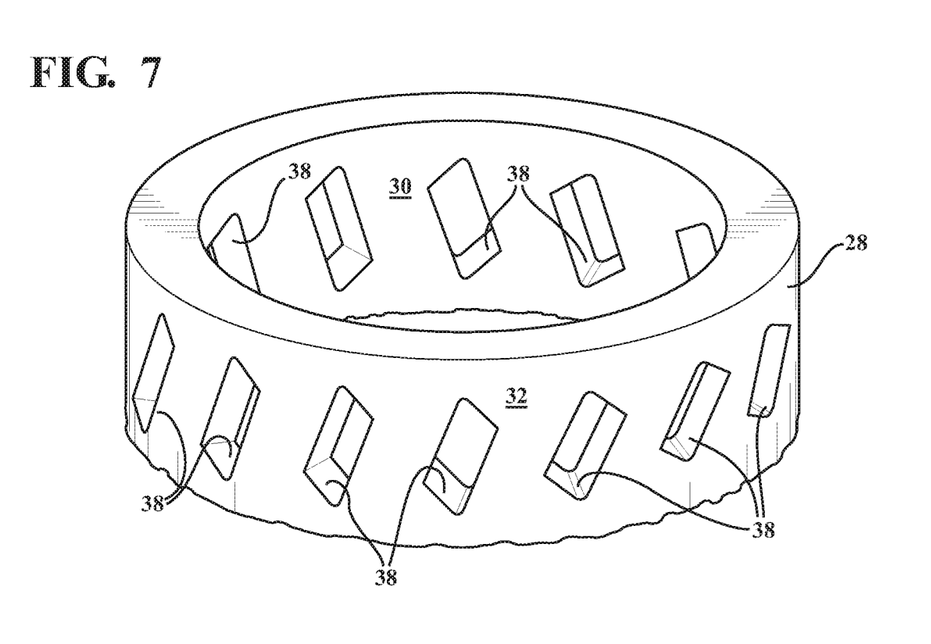
FIG. 7 is a perspective view of a portion of the elastomer spring of FIG. 2 including a plurality of apertures extending parallel to a jounce axis of FIG. 1.
Figure 8:
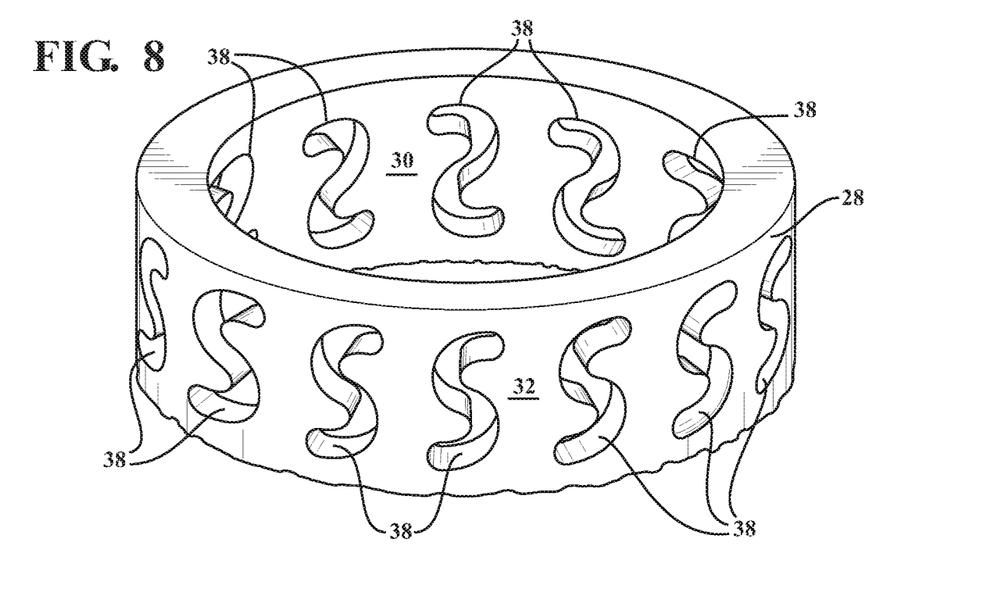
FIG. 8 is a perspective view of a portion of the elastomer spring including a plurality of apertures having an S-shaped configuration.
Figure 9:
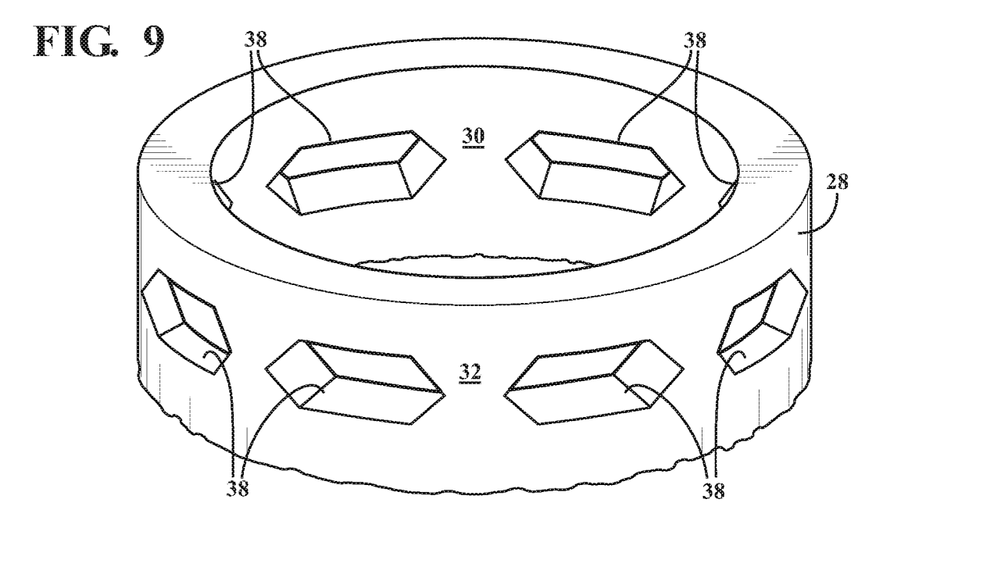
FIG. 9 is a perspective view of a portion of the elastomer spring including a plurality of apertures having a hexagonal configuration.
Figure 10:
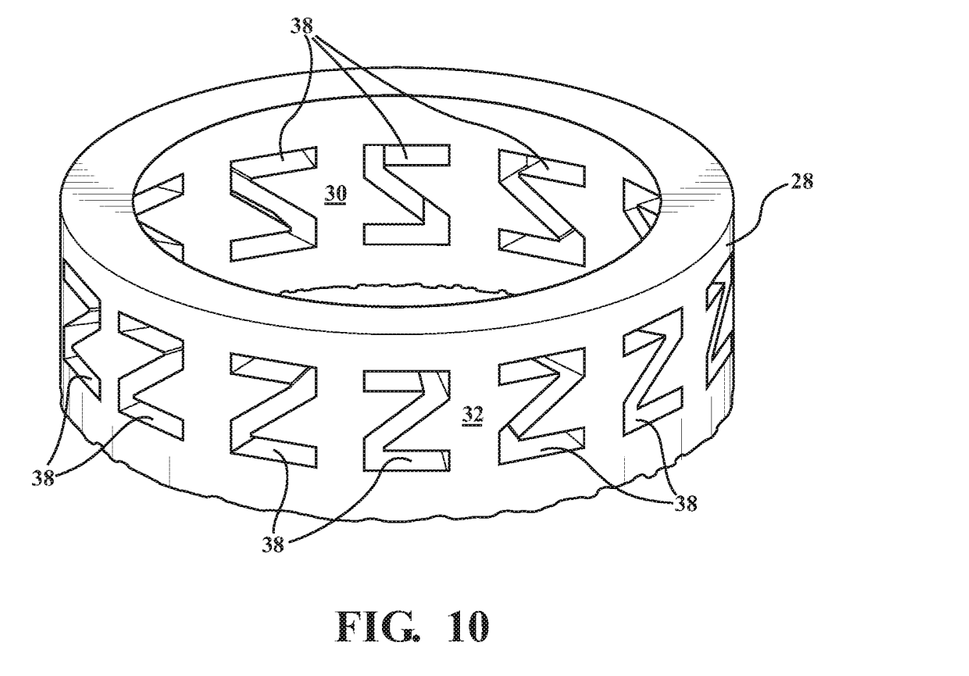
FIG. 10 is a perspective view of a portion of the elastomer spring including a plurality of apertures having a Z-shaped configuration.

The apertures 38 may have any suitable configuration. For example, in the embodiment illustrated in FIGS. 2 and 4, the apertures 38 may be parallelograms. In another embodiment, the apertures 38 may have a rhomboidal configuration, as illustrated in FIG. 5. In yet another embodiment, the apertures 38 may have a rectangular configuration, as illustrated in FIG. 6. The apertures 38 may be polygonal in shape or have at least a curved portion. It should be appreciated that when the apertures 38 are parallelograms, the apertures 38 may be rotated such that opposite corners of the parallelograms are aligned with the jounce axis JA as illustrated in FIG. 7. It should also be appreciated that the apertures 38 may have an S-shaped configuration, as illustrated in FIG. 8, a hexagonal configuration, as illustrated in FIG. 9, or a Z-shaped configuration, as illustrated in FIG. 10. It should further be appreciated that the apertures 38 may be a combination of configurations. It should still further be appreciated that the apertures 38 are similar to that disclosed in a co-pending application Ser. No. 14/433,290, the disclosure of which is hereby expressly incorporated in its entirety herein by reference.

In one embodiment, the apertures 38 may converge toward the axis of the body 28 of the elastomer spring 10. For example, an area of the apertures 38 at the exterior surface 32 may be larger than an area of the apertures 38 at the interior surface 30. Each of the apertures 38 has a length L defined between the interior surface 30 and the exterior surface 32. It should be appreciated that, in one embodiment, a height H and width W of each of the apertures 38 may decrease along the length L of the apertures 38 extending from the exterior surface 32 toward the interior surface 30. It should be also appreciated that, in another embodiment, the width W of the apertures 38 may remain constant while only the height H decreases along the length L of the apertures 38 extending from the exterior surface 32 toward the interior surface 30. It should further be appreciated that, in yet another embodiment, the height H of the apertures 38 may remain constant while only the width W decreases along the length L of the apertures 38 extending from the exterior surface 32 toward the interior surface 30.

Typically, the elastomer spring 10 is made of an elastomeric material. Examples of suitable elastomeric materials for the elastomer spring 10 include block copolymers, such as polyurethanes, etheresters, styrols, and etheramides. Additional examples of suitable elastomeric materials for the elastomer spring 10 include elastomer blends, such as cross-linked and/or non-cross-linked olefins. In one embodiment, the body 28 of the elastomer spring 10 may comprise at least one of TPU, cast urethane, rubber, and elastomer.

Referring to FIG. 3, in another embodiment, the elastomer spring 10 may include a guide 40 disposed within the body 28 for guiding compression of the elastomer spring 10. The guide 40 is a relatively rigid cylindrical member disposed in the interior of the body 28 and having one end extending through the opening 36 of the body 28. It should be appreciated that the guide 40 is optional.

In operation, when the tire 19 of the vehicle 12 hits an obstruction, such as a curb, an impact force is generated. The coil spring 20 is compressed to absorb jounce between the first and second components 16, 18 and to protect the first and second components 16, 18. If the force is large enough, the second component 18 moves toward the first component 16 and compresses the elastomer spring 10, thereby allowing the elastomer spring 10 to absorb the impact force or jounce, resulting from the tire 19 of the vehicle 12 hitting the object. It should be appreciated that the elastomer spring 10 is then compressed to absorb and dampen any remaining force between the first and second components 16, 18. It should also be appreciated that the coil spring 20 may have a stiffness less than a stiffness of the elastomer spring 10 such that the coil spring 20 compresses first before the elastomer spring 10 is compressed.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A suspension system of a vehicle comprising:
   a first component;
   a second component spaced from and movable toward said first component along a jounce axis;
   a coil spring disposed between said first component and said second component; and
   an elastomer spring for absorbing energy between said first component and second component disposed within said coil spring and extending axially between said first component and said second component including a plurality of apertures,
   wherein said apertures are configured to allow said elastomer spring to compress axially for absorbing energy as one of said first component and said second component move along the jounce axis,
   said elastomer spring comprises a cylindrical body,
   said body has a height greater than a width thereof,
   said body includes a passageway having an opening at an upper end thereof, and
   a guide disposed in said passageway of said body and extending outwardly of said passageway only through said opening.

2. A suspension system as set forth in claim 1 wherein said apertures are polygonal in shape.

3. A suspension system as set forth in claim 1 wherein said apertures have at least a curved portion.

4. A suspension system as set forth in claim 1 wherein said body comprises an elastomeric material.

5. A suspension system as set forth in claim 1 wherein said body comprises at least one of TPU, cast urethane, rubber, and elastomer.

6. A suspension system as set forth in claim 1 wherein said body has a thickness of approximately 3 millimeters to approximately 100 millimeters.

7. A suspension system as set forth in claim 1 including at least one flange extending radially outwardly from said body.

8. A suspension system as set forth in claim 7 wherein said body and said flange are integral, unitary, and formed as a one-piece member.

* * * * *